United States Patent
Lee et al.

(10) Patent No.: US 9,346,951 B2
(45) Date of Patent: May 24, 2016

(54) POLYALKYLENE CARBONATE RESIN COMPOSITION

(71) Applicants: SK Innovation Co., Ltd., Seoul (KR); SK Global Chemical Co., Ltd., Seoul (KR)

(72) Inventors: Yun Kyun Lee, Daejeon (KR); Yang Eun Lee, Daejeon (KR); Sung Ik Kim, Daejeon (KR); Seung Gweon Hong, Daejeon (KR); Tae Wook Kwon, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 14/599,835

(22) Filed: Jan. 19, 2015

(65) Prior Publication Data
US 2015/0203681 A1     Jul. 23, 2015

(30) Foreign Application Priority Data

Jan. 20, 2014 (KR) .................. 10-2014-0006799
Nov. 26, 2014 (KR) .................. 10-2014-0166681

(51) Int. Cl.
| | | |
|---|---|---|
| *C08L 69/00* | (2006.01) | |
| *C08L 67/00* | (2006.01) | |
| *C08L 23/00* | (2006.01) | |
| *B32B 27/36* | (2006.01) | |
| *C08L 67/02* | (2006.01) | |
| *C08L 67/04* | (2006.01) | |

(52) U.S. Cl.
CPC ..................................... *C08L 69/00* (2013.01)

(58) Field of Classification Search
CPC ....... C08L 23/00; C08L 69/00; C08L 51/006; C08L 51/08; C08L 69/005; C08L 2205/08
USPC .................................................. 525/185, 468
See application file for complete search history.

(56) References Cited

U.S. PATENT DOCUMENTS

| | | | |
|---|---|---|---|
| 8,133,943 B2 * | 3/2012 | Cho ........................ | C08L 67/04 524/115 |
| 2012/0196958 A1 | 8/2012 | Park et al. | |
| 2013/0102715 A1* | 4/2013 | Kim ....................... | C08G 64/34 524/267 |

FOREIGN PATENT DOCUMENTS

| | | |
|---|---|---|
| KR | 1020090090154 A | 8/2009 |
| KR | 1020100013255 A | 2/2010 |
| KR | 1020100067593 A | 6/2010 |
| KR | 1020120086772 A | 8/2012 |

* cited by examiner

*Primary Examiner* — Fred M Teskin
(74) *Attorney, Agent, or Firm* — The Webb Law Firm

(57) ABSTRACT

Provided is a compounding resin composition containing a compatibilizer, based on polyalkylene carbonate and polyolefin or biodegradable polyester. According to the present invention, a polyalkylene carbonate resin composition capable of improving mechanical properties such as tensile strength, elongation, tearing strength, and the like, or physical properties such as adhesive force, oxygen and moisture barrier properties, heat stability, flexibility, and the like, by preparing and applying the compatibilizer for improving compatibility of the compounding resin, and a multilayer film and a molded product manufactured using the same may be provided.

7 Claims, No Drawings

POLYALKYLENE CARBONATE RESIN COMPOSITION

CROSS-REFERENCE TO RELATED APPLICATIONS

This application claims priority to Korean Patent Application No. 10-2014-0006799, filed Jan. 20, 2014, and Korean Patent Application No. 10-2014-0166681, filed Nov. 26, 2014, the disclosures of which are hereby incorporated in their entirety by reference.

TECHNICAL FIELD

The following disclosure relates to a polyalkylene carbonate resin composition based on polyalkylene carbonate and polyolefin or biodegradable polyester and having improved compatibility.

BACKGROUND

The majority of products used throughout various industries according to the related art are manufactured using petroleum as a raw material. However, in these products, there are problems such as environmental pollution, or the like, caused by emission of green house gas such as a large amount of carbon dioxide, or the like, as well as a price increase due to limited petroleum resources, generation of harmful gas, and consumption of a large amount of energy due to a manufacturing process. Further, after using these products, at the time of landfilling, it takes a long period of time for biodegradation, and at the time of incineration, harmful materials such as environmental hormones, harmful gas, or the like, are emitted, which causes serious environmental contamination, such that these product should be converted into eco-friendly products in the long term.

In accordance with this requirement, industrialization of polyalkylene carbonate has progressed as a polymer using carbon dioxide as a raw material. The polyalkylene carbonate, which is soft rubbery plastic, has excellent processability, and it is easy to adjust degradation characteristics thereof, such that the polyalkylene carbonate is a biodegradable polymer and is eco-friendly. In addition, the polyalkylene carbonate have been applied for various uses as an eco-friendly resin due to excellent strength and transparency, barrier properties, and clean burning characteristics.

However, there is a limitation in an application field of the polyalkylene carbonate due to low flexibility caused by brittle characteristics such as low mechanical strength including tensile strength and tensile elongation, or the like.

Therefore, research into a method of molding the polyalkylene carbonate in a state in which the polyalkylene carbonate is mixed with a different material to improve the existing physical properties thereof has been conducted.

A polyalkylene carbonate resin composition of which physical properties have been improved by using an additive such as a compatibilizer, a plasticizer, and a processing aid has been disclosed in Korean Patent Laid-Open Publication No. 2012-0086772 (Patent Document 1), but there was a problem in that the physical properties may be deteriorated by various additives.

Meanwhile, research into a method of blending polyolefin such as polyethylene, polypropylene, or the like, that is generally used, cheap, and has excellent processability among plastics, to overcome disadvantages of polyalkylene carbonate has been conducted, but since a difference in a solubility parameter between the polyolefin and the polyalkylene carbonate is large, it is difficult to blend the polyolefin and the polyalkylene carbonate.

SUMMARY

An embodiment of the present invention is directed to providing a polyalkylene carbonate resin composition capable of improving mechanical strength including tensile strength and flexibility by mixing polyalkylene carbonate with a polyolefin compound or biodegradable polymer in order to diversify uses of polyalkylene carbonate, which is an eco-friendly material.

In one general aspect, a polyalkylene carbonate resin composition contains:

a base resin composed of (a) polyalkylene carbonate and (b) any one or more resins selected from polyolefin and biodegradable polyester, and (c) a first compatibilizer.

The polyalkylene carbonate resin composition may contain the base resin composed of (a) polyalkylene carbonate and (b) any one or more resins selected from polyolefin and biodegradable polyester, (c) the first compatibilizer, and an initiator.

The polyalkylene carbonate resin composition may contain a base resin composed of 5 to 95 wt % of (a) polyalkylene carbonate and 5 to 95 wt % of (b) any one or more resins selected from polyolefin and biodegradable polyester, and 0.5 to 10 parts by weight of (c) the first compatibilizer based on 100 parts by weight of the base resin. In this case, the polyalkylene carbonate resin composition may further contain the initiator.

The first compatibilizer may be any one or a mixture of two or more selected from (C1-C20)alkyl acrylate based or methacrylate based compounds; styrene based compounds; itaconic acid, crotonic acid, fumaric acid, maleic acid, and anhydrides thereof; and silane based compounds.

The first compatibilizer may be a graft-polymerized compatibilizer containing: a base resin composed of (a') polyalkylene carbonate and (b') any one or more resins selected from polyolefin and biodegradable polyester; (c') a second compatibilizer; and (d) an initiator.

The second compatibilizer may be any one or a mixture of two or more selected from (C1-C20)alkyl acrylate based or methacrylate based compounds; styrene based compounds; itaconic acid, crotonic acid, fumaric acid, maleic acid, and anhydrides thereof; silane based compounds; and glycidyl acrylate, glycidyl methacrylate, or glycidyl ethacrylate.

The first compatibilizer may contain a base resin composed of 20 to 80 wt % of (a') polyalkylene carbonate and 20 to 80 wt % of (b') any one or more resins selected from polyolefin and biodegradable polyester, 0.5 to 10 parts by weight of (c') the second compatibilizer, and 0.01 to 1 part by weight of (d) the initiator, based on 100 parts by weight of the base resin.

The polyalkylene carbonate has a weight average molecular weight of 30,000 to 300,000 g/mol.

In another general aspect, a multilayer film contains the polyalkylene carbonate resin composition as described above.

The multilayer film may include at least one tie layer formed using a resin composition for a tie layer containing polyalkylene carbonate and a first compatibilizer.

The first compatibilizer may be any one or a mixture of two or more selected from (C1-C20)alkyl acrylate based or methacrylate based compounds; styrene based compounds; itaconic acid, crotonic acid, fumaric acid, maleic acid, and anhydrides thereof; and silane based compounds.

The multilayer film may be a packing film having excellent oxygen or moisture barrier properties.

In another general aspect, a molded product contains the polyalkylene carbonate resin composition as described above.

DETAILED DESCRIPTION OF EMBODIMENTS

Hereinafter, a polyalkylene carbonate resin composition according to the present invention will be described in detail. The exemplary embodiments of the present invention to be described below are provided by way of example so that the idea of the present invention can be sufficiently transferred to those skilled in the art to which the present invention pertains. In addition, technical terms and scientific terms used in the present specification have the general meaning understood by those skilled in the art to which the present invention pertains unless otherwise defined, and a description for the known function and configuration obscuring the present invention will be omitted in the following description.

The present inventors studied in order to provide a compatibilizer for improving compatibility in providing a resin composition based on a polyalkylene carbonate resin, and as a result, the present inventors found that at the time of a compounding process of the polyalkylene carbonate resin and a polyolefin or biodegradable polyester resin, compatibility may be maximized and physical properties of the resin may be improved by decreasing interfacial energy between two resins using a specific compatibilizer, thereby completing the present invention.

The polyalkylene carbonate resin composition according to the present invention contains:
a base resin composed of (a) polyalkylene carbonate and (b) any one or more resins selected from polyolefin and biodegradable polyester and (c) a first compatibilizer.

In the present invention, polyalkylene carbonate filed by SK Innovation Co., (Korean Patent Application No. 2008-0015454, and Korean Patent Laid-Open Publication Nos. 2009-0090154, 2010-067593, and 2010-0013255) may be used.

In the present invention, the polyalkylene carbonate is prepared by a copolymerization reaction of carbon dioxide, halogen, and at least one epoxide compound selected from the group consisting of (C2-C20)alkyleneoxide substituted or unsubstituted with halogen, (C1-C20)alkyloxy, (C6-C20) aryloxy, or (C6-C20)ar(C1-C20)alkyl(aralkyl)oxy; (C4-C20) cycloalkyleneoxide substituted or unsubstituted with halogen, (C1-C20)alkyloxy, (C6-C20)aryloxy, or (C6-C20)ar (C1-C20)alkyl(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl)oxy, or (C1-C20)alkyl.

In this case, the epoxide compound may be one or two or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal icosyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxidenorbornene, limonene oxide, dieldrin, 2,3-epoxidepropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxidepropyl ether, epoxypropyl methoxyphenyl ether, biphenyl glycidyl ether, glycidyl naphthyl ether, glycidol acetic acid ester, glycidyl propionate, glycidyl butanoate, glycidyl normal pentanoate, glycidyl normal hexanoate, glycidyl hetanoate, glycidyl normal octanoate, glycidyl 2-ethylhexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

The polyalkylene carbonate according to an exemplary embodiment of the present invention may be polyalkylene carbonate represented by the following Chemical Formula 1.

[Chemical Formula 1]

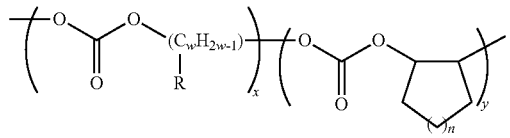

(In Chemical Formula 1, w is an integer of 2 to 10, x is an integer of 5 to 100, y is an integer of 0 to 100, n is an integer of 1 to 3, and R is hydrogen, (C1-C4)alkyl, or —CH$_2$—O—R' (R' is (C1-C8)alkyl).)

Here, alkylene in the polyalkylene carbonate may include ethylene, propylene, 1-butylene, cyclohexene oxide, alkylglycidyl ether, n-butyl, and n-octyl, but is not limited thereto.

The polyalkylene carbonate may be prepared by alternating copolymerization of at least one epoxide compound selected from the group consisting of (C2-C20)alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy, or (C6-C20)ar(C1-C20)alkyl(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl) oxy, or (C1-C20)alkyl and carbon dioxide, by using a complex compound represented by the following Chemical Formula 2 in the presence of a polymer compound including a hydroxyl or carboxylic acid group at a terminal or a side chain thereof.

[Chemical Formula 2]

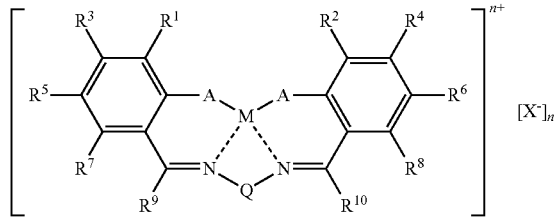

[In Chemical Formula 2,

M is trivalent cobalt or trivalent chromium;

A is an oxygen or sulfur atom;

Q is a diradical linking two nitrogen atoms;

$R^1$ to $R^{10}$ are each independently hydrogen; halogen; (C1-C20)alkyl; (C1-C20)alkyl containing at least one of halogen, nitrogen, oxygen, silicon, sulfur, and phosphorus; (C2-C20)alkenyl; (C2-C20)alkenyl containing at least one of halogen, nitrogen, oxygen, silicon, sulfur, and phosphorus; (C1-C20)alkyl(C6-C20)aryl; (C1-C20)alkyl(C6-C20)aryl containing at least one of halogen, nitrogen, oxygen, silicon, sulfur, and phosphorus; (C6-C20)aryl(C1-C20)alkyl; (C6-C20)aryl(C1-C20)alkyl containing at least one of halogen, nitrogen, oxygen, silicon, sulfur, and phosphorus; (C1-C20)alkoxy; (C6-C30)aryloxy; formyl; (C1-C20)alkylcarbonyl; (C6-C20)arylcarbonyl; or a metalloid radical of a Group 14 metal substituted with hydrocarbyl;

two of $R^1$ to $R^{10}$ are linked to each other to form a ring;

at least one of the hydrogens contained in $R^1$ to $R^{10}$ and Q is a protonated group selected from the group consisting of the following Chemical Formulas a, b, and c;

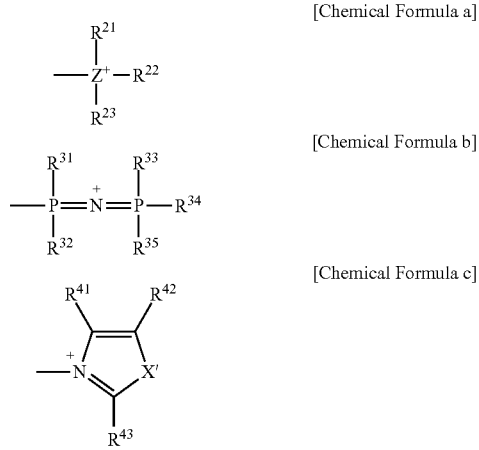

[Chemical Formula a]

[Chemical Formula b]

[Chemical Formula c]

Each $X^-$ is independently a halide anion; $HCO_3^-$; $BF_4^-$; $ClO_4^-$; $NO_3^-$; $PF_6^-$; (C6-C20)aryloxy anion; (C6-C20)aryloxy anion containing at least one of a halogen atom, a nitrogen atom, an oxygen atom, a silicon atom, a sulfur atom, and a phosphorus atom; (C1-C20)alkylcarboxyl anion; (C1-C20)alkyl carboxyl anion containing at least one of a halogen atom, a nitrogen atom, an oxygen atom, a silicon atom, a sulfur atom, and a phosphorus atom; (C6-C20)arylcarboxyl anion; (C6-C20)arylcarboxyl anion containing at least one of a halogen atom, a nitrogen atom, an oxygen atom, a silicon atom, a sulfur atom, and a phosphorus atom; (C1-C20)alkoxy anion; (C1-C20)alkoxy anion containing at least one of a halogen atom, a nitrogen atom, an oxygen atom, a silicon atom, a sulfur atom, and an phosphorus atom; (C1-C20)alkylcarbonate anion; (C1-C20)alkylcarbonate anion containing at least one of a halogen atom, a nitrogen atom, an oxygen atom, a silicon atom, a sulfur atom, and a phosphorus atom; (C6-C20)arylcarbonate anion; (C6-C20)arylcarbonate anion containing at least one of a halogen atom, a nitrogen atom, an oxygen atom, a silicon atom, a sulfur atom, and a phosphorus atom; (C1-C20)alkylsulfonate anion; (C1-C20)alkylsulfonate anion containing at least one of a halogen atom, a nitrogen atom, an oxygen atom, a silicon atom, a sulfur atom, and a phosphorus atom; (C1-C20)alkylamido anion; (C1-C20)alkylamido anion containing at least one of a halogen atom, a nitrogen atom, an oxygen atom, a silicon atom, a sulfur atom, and a phosphorus atom; (C6-C20)arylamido anion; (C6-C20)arylamido anion containing at least one of a halogen atom, a nitrogen atom, an oxygen atom, a silicon atom, a sulfur atom, and a phosphorus atom; (C1-C20)alkylcarbamate anion; (C1-C20)alkylcarbamate anion containing at least one of a halogen atom, a nitrogen atom, an oxygen atom, a silicon atom, a sulfur atom, and a phosphorus atom; (C6-C20)arylcarbamate anion; and (C6-C20)arylcarbamate anion containing at least one of a halogen atom, a nitrogen atom, an oxygen atom, a silicon atom, a sulfur atom, and a phosphorus atom;

Z is a nitrogen or phosphorus atom;

$R^{21}$, $R^{22}$, $R^{23}$, $R^{31}$, $R^{32}$, $R^{33}$, $R^{34}$, and $R^{35}$ are each independently (C1-C20)alkyl; (C1-C20)alkyl containing at least one of halogen, nitrogen, oxygen, silicon, sulfur, and phosphorus; (C2-C20)alkenyl; (C2-C20)alkenyl containing at least one of halogen, nitrogen, oxygen, silicon, sulfur, and phosphorus; (C1-C20)alkyl(C6-C20)aryl; (C1-C20)alkyl (C6-C20)aryl containing at least one of halogen, nitrogen, oxygen, silicon, sulfur, and phosphorus; (C6-C20)aryl(C1-C20)alkyl; (C6-C20)aryl(C1-C20)alkyl containing at least one of halogen, nitrogen, oxygen, silicon, sulfur, and phosphorus; or a metalloid radical of a Group 14 metal substituted with hydrocarbyl; two of $R^{21}$, $R^{22}$, and $R^{23}$ or two of $R^{31}$, $R^{32}$, $R^{33}$, $R^{34}$, and $R^{35}$ being linked to each other to form a ring;

$R^{41}$, $R^{42}$, and $R^{43}$ are each independently hydrogen; (C1-C20)alkyl; (C1-C20)alkyl containing at least one of halogen, nitrogen, oxygen, silicon, sulfur, and phosphorus; (C2-C20)alkenyl; (C2-C20)alkenyl containing at least one of halogen, nitrogen, oxygen, silicon, sulfur, and phosphorus; (C1-C20)alkyl(C6-C20)aryl; (C1-C20)alkyl(C6-C20)aryl containing at least one of halogen, nitrogen, oxygen, silicon, sulfur, and phosphorus; (C6-C20)aryl(C1-C20)alkyl; (C6-C20)aryl(C1-C20)alkyl containing at least one of halogen, nitrogen, oxygen, silicon, sulfur, and phosphorus; or a metalloid radical of Group 14 metal substituted with hydrocarbyl; two of $R^{41}$, $R^{42}$, and $R^{43}$ being linked to each other to form a ring;

X' is an oxygen atom, a sulfur atom, or N—R (here, R is (C1-C20)alkyl);

n is an integer obtained by adding one to the total number of protonated groups contained in $R^1$ to $R^{10}$ and Q;

$X^-$ is coordinated to M; and a nitrogen atom of imine is de-coordinated from M.]

In the present invention, a preferable polyalkylene carbonate resin may be polypropylene carbonate obtained by copolymerization of polypropylene oxide and carbon dioxide.

In the present invention, a weight average molecular weight of the polyalkylene carbonate is not limited, but may be preferably 30,000 to 300,000 g/mol. In the above-mentioned range, physical properties including mechanical strength may be improved by a combination with other components.

In the present invention, the weight average molecular weight was measured using gel permeation chromatography (GPC, Lient Technologies 1200 series) after dissolving a powder sample in tetrahydrofuran (THF) (here, Shodex LF-804 (8.0.1.D.×300 mm) was used as a column, and polystyrene (Shodex) was used as a standard sample).

In the present invention, the compatibilizer, that is a first or second compatibilizer, is effective to decrease interfacial energy between the polyalkylene carbonate and the polyolefin or the biodegradable polyester and improve compatibility with the polymer while suppressing phase separation between heterogeneous resins. A weight average molecular weight of the compatibilizer is not limited, but in order to suppress phase separation between heterogeneous resins and improve compatibility, preferably, a compatibilizer selected from low molecular weight compatibilizers having a weight average molecular weight of 100 to 2,000 g/mol or high molecular weight compatibilizers having a weight average molecular weight of 30,000 to 200,000 g/mol may be used. In this case, the high molecular weight compatibilizer may be a grafted polymer resin by performing a graft-polymerization reaction of the low molecular weight compatibilizer having a weight average molecular weight of 100 to 2,000 g/mol to a polymer used as a matrix resin using an initiator.

In the case of using the low molecular weight compatibilizer, the low molecular weight compatibilizer may be directly added due to a compounding process of the resin. In this case, an initiator may be further contained.

In addition, according to the present invention, the high molecular weight compatibilizer may be used instead of the low molecular weight compatibilizer.

The high molecular weight compatibilizer according to the present invention, which is prepared by performing the graft-polymerization reaction of the low molecular weight compatibilizer to the same polymer as a matrix resin of the polyalkylene carbonate resin composition, may significantly improve compatibility with the matrix resin, and compatibility may be further improved by a combination the high molecular weight compatibilizer with a mixture of the polyalkylene carbonate and the polyolefin or biodegradable polyester.

According to the present invention, in the case of directly using the low molecular weight compatibilizer in a solution state, compatibility may be improved by simultaneously reacting the low molecular weight compatibilizer with two compounded resins using the initiator. Further, in the case of using a low molecular weight compatibilizer graft-polymerized polymer resin as the compatibilizer, compatibility with other resins may be improved using compatibility between resins and compatibility with the low molecular weight compatibilizer and any one resin.

As a preferable aspect of the present invention, there is provided a polyalkylene carbonate resin composition containing a first compatibilizer composed to contain polyalkylene carbonate, any one or more resins selected from polyolefin and biodegradable polyester, a second compatibilizer, and an initiator, based on the base resin composed of the polyalkylene carbonate and any one or more resins selected from the polyolefin and biodegradable polyester.

In the present invention, the polyolefin may be preferably any one or more selected from polypropylene and polyethylene, but is not necessarily limited thereto.

In the present invention, any polyester polymer may be used without limitation as the biodegradable polyester as long as it has a biodegradable property.

A preferable example of the biodegradable polyester may include poly(butylene adipate-co-terephthalate (PBAT), poly lactic acid (PLA), poly hydroxyalkanoate (PHA), poly glycolic acid (PGA), poly butylene succinate (PBS), poly ε-caprolactone (PCL), poly butylene succinate adipate (PBSA), poly(butylene succinate-co-terephthalate) (PBST), poly(butylenes sebacate-co-terephthalate (PBSBT), or the like, but is not necessarily limited thereto.

It is preferable that as the initiator, a peroxide based compound is used. For example, the peroxide compound may be selected from the group consisting of dicumyl peroxide, t-butyl peroxylaurate, 1,1,3,3-t-methylbutylperoxy-2-ethyl hexanoate, 2,5-dimethyl-2,5-di(2-ethylhexanoyl peroxy) hexane, 1-cyclohexyl-1-methylethyl peroxy-2-ethyl hexanoate, 2,5-dimethyl-2,5-di(m-toluoyl peroxy) hexane, t-butyl peroxy isopropyl monocarbonate, t-butyl peroxy-2-ethylhexyl monocarbonate, t-hexyl peroxy benzoate, t-butyl peroxy acetate, 2,5-dimethyl-2,5-di(t-butyl peroxy) hexane, t-butyl cumyl peroxide, t-hexyl peroxy neodecanoate, t-hexyl peroxy-2-ethyl hexanoate, t-butyl peroxy-2-2-ethylhexanoate, t-butyl peroxy isobutylate, 1,1-bis(t-butyl peroxy)cyclohexane, t-hexyl peroxy isopropyl monocarbonate, t-butyl peroxy-3,5,5-trimethyl hexanoate, t-butyl peroxy pivalate, cumyl peroxy neodecanoate, di-iso-propyl benzene hydroperoxide, cumene hydroperoxide, iso-butyl peroxide, 2,4-dichlorobenzoyl peroxide, 3,5,5-trimethyl hexanoyl peroxide, octanoyl peroxide, lauroyl peroxide, stearoyl peroxide, succinic peroxide, benzoyl peroxide, 3,5,5-trimethyl hexanoyl peroxide, benzoyl peroxy toluene, 1,1,3,3-tetramethyl butyl peroxy neodecanoate, 1-cyclohexyl-1-methyl ethyl peroxy neodecanoate, di-n-propyl peroxy dicarbonate, di-iso-propyl peroxy carbonate, bis(4-t-butyl cyclohexyl) peroxy dicarbonate, di-2-ethoxy methoxy peroxy dicarbonate, di(2-ethyl hexyl peroxy) dicarbonate, dimethoxy butyl peroxy dicarbonate, di(3-methyl-3-methoxy butyl peroxy) dicarbonate, 1,1-bis(t-hexyl peroxy)-3,3,5-trimethyl cyclohexane, 1,1-bis(t-hexyl peroxy) cyclohexane, 1,1-bis(t-butyl peroxy)-3,3,5-trimethyl cyclohexane, 1,1-(t-butyl peroxy) cyclododecane, 2,2-bis(t-butyl peroxy)decane, t-butyl trimethyl silyl peroxide, bis(t-butyl) dimethyl silyl peroxide, t-butyl triallyl silyl peroxide, bis(t-butyl) diallyl silyl peroxide, and tris(t-butyl) aryl silyl peroxide.

In the present invention, the first compatibilizer may be any one or a mixture of two or more selected from (C1-C20)alkyl acrylate based or methacrylate based compounds; styrene based compounds; itaconic acid, crotonic acid, fumaric acid, maleic acid, and anhydrides thereof; and silane based compounds. A specific example of the first compatibilizer may include styrene based compounds such as ethylbenzene, divinylbenzene, p-ethylvinylbenzene, and the like; (C1-C20) alkyl acrylate based or methacrylate based compound corresponding to any one or a mixture of two or more selected from methyl acrylate, ethyl acrylate, butyl acrylate, 2-ethylhexyl acrylate, lauryl methacrylate, ethyl methacrylate, n-butyl methacrylate, and n-hexyl methacrylate; or hydroxy(C1-C20)alkyl acrylate based or methacrylate based compound corresponding to any one or a mixture of two or more selected from hydroxyethyl acrylate, hydroxypropyl acrylate, 2-hydroxyethyl methacrylate, hydroxypropyl methacrylate, and glycidyl methacrylate.

In addition, as the silane based compound, a silane coupling agent may be preferably used. The silane coupling agent may be selected from the group consisting of vinyl trimethoxysilane, vinyl triethoxysilane, vinyl tris methoxysilane, 3-methacryloxy propyl trimethoxysilane, 3-glycidoxy trimethoxysilane, 2-glycidoxy propyl trimethoxysilane, 3-glycidoxypropyl methyl dimethoxysilane, 3-glycidoxy propyl methyl diethoxysilane, N-2-(amino ethyl)-3-amino propyl triethoxysilane, N-phenol-3-amino propyl trimethoxysilane, 3-amino propyl tri ethoxysilane, N-2-(aminoethyl)-3-amino-propyl methyl dimethoxysilane, N-2-(aminoethyl)-3-amino propyl trimethoxysilane, 3-mercapto propyl trimethoxysilane, 3-(2-imidazol-yl)propyl triethoxysilane, 3-chloropropyl trimethoxysilane, tris-[3-(trimethoxysilyl)propyl]isocyanurate, tris-[3-(triethoxysilyl)propyl]isocyanurate, tris-[3-(dimethoxysilyl)propyl]isocyanurate, and tris-[3-(methyldimethoxysilyl)propyl]isocyanurate, but is not necessarily limited thereto.

In the present invention, the first compatibilizer may include a compatibilized graft-copolymer prepared by reacting a composition containing a base resin composed of (a') polyalkylene carbonate and (b') any one or more resins selected from polyolefin and biodegradable polyester, (c') a second compatibilizer, and (d) an initiator.

In this case, the second compatibilizer may be any one or a mixture of two or more selected from (C1-C20)alkyl acrylate based or methacrylate based compounds; styrene based compounds; itaconic acid, crotonic acid, fumaric acid, maleic acid, and anhydrides thereof; silane based compounds; and glycidyl acrylate, glycidyl methacrylate, or glycidyl ethacrylate; but is not necessarily limited thereto.

In a preferable aspect of the present invention, the polyalkylene carbonate resin composition contains a base resin composed of 5 to 95 wt % of (a) polyalkylene carbonate and 5 to 95 wt % of (b) any one or more resins selected from polyolefin and biodegradable polyester, and 0.5 to 10 parts by weight of (c) the first compatibilizer, based on 100 parts by weight of the base resin.

In this case, when a content of the first compatibilizer is out of the above-mentioned range, compatibility may not be sufficiently improved, such that physical properties may not be improved.

In a preferable aspect of the present invention, the first compatibilizer may contain s a base resin composed of 20 to 80 wt % of (a') polyalkylene carbonate and 20 to 80 wt % of (b') any one or more resins selected from polyolefin and biodegradable polyester, 0.5 to 10 parts by weight of (c') the second compatibilizer, and 0.1 to 1 part by weight of (d) the initiator, based on 100 parts by weight of the base resin.

In this case, when a content of the second compatibilizer is less than 0.5 parts by weight, compatibility may not be sufficiently improved, and when the content is more than 10 parts by weight, the added compatibilizer is present in a single independent phase, thereby deteriorating physical properties rather than improving compatibility of the matrix polymer.

In addition, the content of the initiator may be preferably 0.01 to 1 part by weight based on 100 parts by weight of the base resin. When the content of the initiator is within the above-mentioned range, compatibility of the matrix resin may be improved by combination with other components, such that physical properties may be improved.

The present invention provides a multilayer film including at least one film manufactured by using the above-mentioned polyalkylene carbonate resin composition.

The multilayer film may include a tie layer. A resin composition for a tie layer forming the tie layer may contain polyalkylene carbonate and the first compatibilizer. As an example, the multilayer film according to the present invention may include at least one tie layer between extruded sheets, a tie layer between extruded films, a tie layer between cast sheets, or a tie layer between cast films. In this case, content ranges of the base resin and the first compatibilizer are not particularly limited. The tie layer according to an exemplary embodiment of the present invention is formed using a mixture of a polypropylene carbonate and ethylene methacrylate copolymer. A weight mixing ratio of the polypropylene carbonate and ethylene methacrylate copolymer may be 9:1 to 1:9, preferably 7:3 to 3:7, but is not necessarily limited thereto.

The multilayer film may be applied to a packing film having an excellent oxygen or moisture barrier property.

After manufacturing films having a thickness of 80 μm using polypropylene carbonate and polypropylene, respectively, oxygen permeability was measured at 25° C. by a measuring method according to ASTM D3985 using an oxygen permeability measuring apparatus (Mocon). As a result, it may be appreciated that oxygen permeability of the films were 30 cc/m²·day and 40 cc/m²·day, such that at the time of applying the polyalkylene carbonate to a multilayer film, excellent oxygen barrier properties may be implemented.

In addition, as the multilayer film according to an exemplary embodiment of the present invention, a five-layer film composed of linear low density polyethylene-tie layer-polypropylene carbonate-tie layer-linear low density polyethylene (LLDPE-Tie-PPC-Tie-LLDPE) may be manufactured, and this multilayer film may have oxygen permeability of 30 to 100 cc/m²·day regardless of humidity, based on an entire thickness of 100 μm.

In addition, the present invention may provide a molded product containing the above-mentioned polyalkylene carbonate resin composition.

In the polyalkylene carbonate resin composition according to the present invention, mechanical properties such as tensile strength, elongation, tearing strength, and the like, or physical properties such as adhesive force, barrier properties, heat stability, flexibility, and the like, may be improved. Further, the polyalkylene carbonate resin composition may be used in a flexible packaging product having excellent barrier properties, a film having biodegradability (a mulching film, a shopping bag, a standard plastic garbage bag, or the like), or an injection product.

In addition, the polyalkylene carbonate resin composition according to the present invention may be eco-friendly and applied for various purposes throughout industries.

Hereinafter, Examples will be provided in order to describe the present invention in more detail. However, the present invention is not limited to the following Examples.

EXAMPLE 1

A resin composition in which 0.1 part by weight of dicumyl peroxide and 1 part by weight of maleic acid anhydride were dry-mixed, based on 100 parts by weight of a base resin A composed of 50 wt % of polypropylene carbonate (GeenPol™ manufactured by SK Energy) having a weight average molecular weight of 130,000 g/mol and 50 wt % of polypropylene was prepared and then melt-extruded using a twin-screw extruder. Here, a temperature gradient of the extruder was (die) 160-180-190-190-160-140 (feeder) (unit: ° C.), and extrusion was performed at 150 rpm. After processing the extruded resin to form a film using a small-size casting film machine, physical properties thereof were measured, and the results were shown in the following Table 1. Next, a multilayer film was manufactured by using the extruded resin as a tie layer and co-extruding polypropylene carbonate (PPC, GeenPol™ manufactured by SK Energy) and polypropylene (PP) using a multilayer blown film molding machine. The multilayer film was formed to have a thickness of 30 μm(PP)/10 μm(tie)/10 μm(PPC). After measuring adhesive force of the manufactured multilayer film, the result was shown in the following Table 1. In this case, at the time of measuring adhesive force, adhesive strength was relatively evaluated by measuring whether or not the polypropylene carbonate layer and the polypropylene layer were separated from each other, and the case in which they were not separated from each other and the case in which they were separated from each other were distinguished and represented by symbols "O" and "X", respectively.

EXAMPLE 2

A resin composition in which 0.1 part by weight of dicumyl peroxide and 2 parts by weight of vinyl triethoxysilane were dry-mixed, based on 100 parts by weight of a base resin A composed of 50 wt % of polypropylene carbonate (GeenPol™ manufactured by SK Energy) having a weight average molecular weight of 130,000 g/mol and 50 wt % of polypropylene was prepared and then melt-extruded using a twin-screw extruder. Here, a temperature gradient of the extruder was (die) 160-180-190-190-160-140 (feeder) (unit: ° C.), and extrusion was performed at 150 rpm. After processing the extruded resin to form a film using a small-size casting film machine, physical properties thereof were measured, and the results were shown in the following Table 1. Next, a multilayer film was manufactured by using the extruded resin as a tie layer and co-extruding polypropylene carbonate (Geen-Pol™ manufactured by SK Energy) and polypropylene using a multilayer blown film molding machine. The multilayer film was formed to have a thickness of 30 μm(PP)/10 μm(tie)/10 μm(PPC). After measuring adhesive force of the manufactured multilayer film, the result was shown in the following Table 1. In this case, at the time of measuring adhesive force, adhesive strength was relatively evaluated by measuring whether or not the polypropylene carbonate layer and the polypropylene layer were separated from each other, and the case in which they were not separated from each other and the case in which they were separated from each other were distinguished and represented by symbols "O" and "X", respectively.

EXAMPLE 3

A resin composition in which 3 parts by weight of an ethylene methacrylate (EMA) copolymer was dry-mixed based on 100 parts by weight of a base resin A composed of 50 wt % of polypropylene carbonate (GeenPol™ manufactured by SK Energy) having a weight average molecular weight of 130,000 g/mol and 50 wt % of polypropylene was prepared and then melt-extruded using a twin-screw extruder. Here, a temperature gradient of the extruder was (die) 160-180-190-190-160-140 (feeder) (unit: ° C.), and extrusion was performed at 150 rpm. After processing the extruded resin to form a film using a small-size casting film machine, physical properties thereof were measured, and the results were shown in the following Table 1. Next, a multilayer film was manufactured by using the extruded resin as a tie layer and co-extruding polypropylene carbonate (GeenPol™ manufactured by SK Energy) and polypropylene using a multilayer blown film molding machine. The multilayer film was formed to have a thickness of 30 μm(PP)/10 μm(tie)/10 μm(PPC). After measuring adhesive force of the manufactured multilayer film, the result was shown in the following Table 1. In this case, at the time of measuring adhesive force, adhesive strength was relatively evaluated by measuring whether or not the polypropylene carbonate layer and the polypropylene layer were separated from each other, and the case in which they were not separated from each other and the case in which they were separated from each other were distinguished and represented by symbols "O" and "X", respectively.

EXAMPLE 4

Based on 100 parts by weight of a base resin B composed of 50 wt % of polypropylene carbonate (GeenPol™ manufactured by SK Energy) having a weight average molecular weight of 130,000 g/mol and 50 wt % of polyethylene, parts by weight of an ethylene methacrylate (EMA) copolymer was added thereto and then melt-extruded using a twin-screw extruder. Here, a temperature gradient of the extruder was (die) 160-180-190-190-160-140 (feeder) (unit: ° C.), and extrusion was performed at 150 rpm, thereby manufacturing a film (thickness: 0.1 mm) using a casting film molding machine. After processing the extruded resin to form a film using a small-size casting film machine, physical properties thereof were measured, and the results were shown in the following Table 1. In addition, a multilayer film was manufactured by co-extruding polypropylene carbonate (Geen-Pol™ manufactured by SK Energy) and polyethylene (PE) using a multilayer blown film molding machine. Here, the resin composition was used as a tie layer. The multilayer film was formed to have a thickness of 25 μm(PE)/10 μm(tie)/15 μm(PPC). After measuring adhesive force of the manufactured multilayer film, the result was shown in the following Table 1. In this case, at the time of measuring adhesive force, adhesive strength was relatively evaluated by measuring whether or not the polypropylene carbonate layer and the polyethylene layer were separated from each other, and the case in which they were not separated from each other and the case in which they were separated from each other were distinguished and represented by symbols "O" and "X", respectively.

EXAMPLE 5

A mixture obtained by dry-mixing 0.1 part by weight of dicumyl peroxide and 1 part by weight of glycidyl methacrylate, based on 100 parts by weight of polypropylene carbonate (GeenPol™ manufactured by SK Energy) having a weight average molecular weight of 130,000 g/mol was melt-extruded using a twin-screw extruder. Here, a temperature gradient of the extruder was (die) 110-150-160-170-150-90 (feeder) (unit: ° C.), and extrusion was performed at 150 rpm.

A mixture obtained by dry-mixing 0.1 part by weight of dicumyl peroxide and 1 part by weight of glycidyl methacrylate based on 100 parts by weight of a base resin composed of 5 wt % of the extruded resin, 25 wt % of polypropylene carbonate, and 70 wt % of a polyester polymer (Ecoflex manufactured by Basf) was melt-extruded using a twin-screw extruder. Here, a temperature gradient of the extruder was (die) 110-150-160-170-150-90 (feeder) (unit: ° C.), and extrusion was performed at 150 rpm. A film having a thickness of 0.1 mm was manufactured from the extruded mixture using a casting film molding machine, and physical properties (tensile strength, elongation, and tearing strength) thereof were measured. The results were shown in the following Table 2.

EXAMPLE 6

After stirring a mixture in which a solution obtained by dissolving 0.1 part by weight of dicumyl peroxide in 10 g of ethanol was dry-mixed based on 100 parts by weight of a base resin C composed of 30 wt % of polypropylene carbonate (GeenPol™ manufactured by SK Energy) having a weight average molecular weight of 130,000 g/mol and 70 wt % of a polyester polymer (Ecoflex manufactured by Basf), 2 parts by weight of vinyl triethoxysilane were mixed therewith and melt-extruded using a twin-screw extruder. Here, a temperature gradient of the extruder was (die) 110-150-160-170-150-90 (feeder) (unit: ° C.), and extrusion was performed at 150 rpm. A film having a thickness of 0.1 mm was manufactured from the extruded mixture using a casting film molding machine, and physical properties (tensile strength, elongation, and tearing strength) thereof were measured. The results were shown in the following Table 2.

EXAMPLE 7

A obtained by dry-mixing 0.1 part by weight of dicumyl peroxide and 12 parts by weight of glycidyl methacrylate based on 100 parts by weight of polypropylene carbonate (GeenPol™ manufactured by SK Energy) having a weight average molecular weight of 130,000 g/mol was melt-extruded using a twin-screw extruder. Here, a temperature gradient of the extruder was (die) 110-150-160-170-150-90 (feeder) (unit: °C.), and extrusion was performed at 150 rpm.

A mixture obtained by dry-mixing 0.1 part by weight of dicumyl peroxide and 12 parts by weight of glycidyl methacrylate based on 100 parts by weight of a base resin composed of 5 wt % of the extruded resin, 25 wt % of polypropylene carbonate (GeenPol™ manufactured by SK Energy), and 70 wt % of a polyester polymer (Ecoflex manufactured by Basf) was melt-extruded using a twin-screw extruder. Here, a temperature gradient of the extruder was (die) 110-150-160-170-150-90 (feeder) (unit: °C.), and extrusion was performed at 150 rpm. A film having a thickness of 0.1 mm was manufactured from the extruded mixture using a casting film molding machine, and physical properties (tensile strength, elongation, and tearing strength) thereof were measured. The results were shown in the following Table 2.

EXAMPLE 8

A mixture obtained by dry-mixing 0.1 part by weight of dicumyl peroxide and 0.1 part by weight of glycidyl methacrylate based on 100 parts by weight of polypropylene carbonate (GeenPol™ manufactured by SK Energy) having a weight average molecular weight of 130,000 g/mol was melt-extruded using a twin-screw extruder. Here, a temperature gradient of the extruder was (die) 110-150-160-170-150-90 (feeder) (unit: °C.), and extrusion was performed at 150 rpm.

A mixture obtained by dry-mixing 0.1 part by weight of dicumyl peroxide and 0.1 part by weight of glycidyl methacrylate based on 100 parts by weight of a base resin composed of 5 wt % of the extruded resin, 25 wt % of polypropylene carbonate (GeenPol™ manufactured by SK Energy), and 70 wt % of a polyester polymer (Ecoflex manufactured by Basf) was melt-extruded using a twin-screw extruder. Here, a temperature gradient of the extruder was (die) 110-150-160-170-150-90 (feeder) (unit: °C.), and extrusion was performed at 150 rpm. A film having a thickness of 0.1 mm was manufactured from the extruded mixture using a casting film molding machine, and physical properties (tensile strength, elongation, and tearing strength) thereof were measured.

EXAMPLE 9

A mixture of 50 wt % of polypropylene carbonate (GeenPol™ manufactured by SK Energy) having a weight average molecular weight of 130,000 g/mol and 50 wt % of an ethylene methacrylate copolymer was melt-extruded using a two-screw extruder. Here, a temperature gradient of the extruder was (die) 130-150-160-160-150-110 (feeder) (unit: °C.), and extrusion was performed at 150 rpm. Next, a multilayer film was manufactured by using the extruded resin as a tie layer and co-extruding polypropylene carbonate (GeenPol™ manufactured by SK Energy) and polyethylene using a multilayer blown film molding machine. The multilayer film was formed to have a thickness of 25 µm(PE)/10 µm(tie)/15 µm(PPC). In this case, at the time of measuring adhesive force, adhesive strength was relatively evaluated by measuring whether or not the polypropylene carbonate layer and the polyethylene layer were separated from each other, and the case in which they were not separated from each other and the case in which they were separated from each other were distinguished and represented by symbols "O" and "X", respectively.

COMPARATIVE EXAMPLE 1

Comparative Example 1 was performed in the same manner as in Example 1 except for using only the base resin A without using dicumyl peroxide and maleic acid anhydride.

COMPARATIVE EXAMPLE 2

Comparative Example 2 was performed in the same manner as in Example 4 except for using a base resin C composed of 30 wt % of polypropylene carbonate and 70 wt % of polylactic acid instead of the base resin A.

COMPARATIVE EXAMPLE 3

Comparative Example 3 was performed in the same manner as in Example 6 except for using only the base resin C without using dicumyl peroxide, ethanol, and vinyl triethoxysilane.

TABLE 1

| | Tensile Strength (Kgf/cm$^2$) | Elongation (%) | Tearing Strength (Kgf/cm) | Adhesive Force |
|---|---|---|---|---|
| Example 1 | 283 | 659 | 110 | O |
| Example 2 | 280.66 | 645.7 | 115 | O |
| Example 3 | 250 | 30 | 106 | O |
| Example 4 | 338 | 844 | 148 | O |
| Comparative Example 1 | 199 | <50 | 98 | X |
| Comparative Example 2 | 168 | 623 | 154 | X |

As shown in Table 1, it may be confirmed that in Examples 1 to 3, maleic acid anhydride, vinyl triethoxysilane, or the ethylene methacrylate copolymer, were contained respectively, such that compatibility of a polypropylene carbonate and polypropylene compounding resin may be significantly improved, and accordingly, mechanical properties and adhesive force with each of the resins on the multilayer film may be simultaneously improved. Further, in Example 4, compatibility between polypropylene carbonate and polyethylene was improved, such that mechanical properties and adhesive strength could be improved. On the contrary, in Comparative Example 1, tensile strength, elongation, and tearing strength were significantly decreased as compared to the Examples, and adhesive force between the polypropylene carbonate layer and the polypropylene layer was weak, such that the polypropylene carbonate layer and the polypropylene layer were easily separated from each other. Further, in Comparative Example 2, elongation and tearing strength were excellent, but tensile strength and adhesive force were significantly decreased.

Meanwhile, in Example 9 in which the tie layer between the polypropylene carbonate layer and the polyethylene layer was formed using the resin composition composed of polypropylene carbonate and ethylene methacrylate copolymer, as a result of measuring adhesive force, the tie layer was not separated from the polypropylene carbonate layer and the polyethylene layer. Therefore, it was confirmed that adhesive force was improved.

TABLE 2

|  | Tensile Strength (Kgf/cm$^2$) | Elongation (%) | Tearing Strength (Kgf/cm) |
| --- | --- | --- | --- |
| Example 5 | 446 | 502 | 138 |
| Example 6 | 449 | 506 | 150 |
| Example 7 | 374 | 540 | 124 |
| Example 8 | 385 | 410 | 126 |
| Comparative Example 3 | 371 | 391 | 123 |

As shown in Table 2, in Examples 5 and 6, compatibility of a polypropylene carbonate and the polyester polymer compounding resin may be improved, such that mechanical strength may be improved, and in Examples 7 and 8, a content of added glycidyl methacrylate was excessively high or low, such that tensile strength and tearing strength were slightly decreased, but elongation properties were good. On the contrary, in Comparative Example 3, since the initiator and the compatibilizer were not used, such that mechanical properties were deteriorated as compared to the Examples according to the present invention.

In the polyalkylene carbonate resin composition according to the present invention, compatibility with respect to polyalkylene carbonate and the polyolefin or biodegradable polyester resin may be significantly improved, such that the mechanical properties such as tensile strength, elongation, tearing strength, and the like, or the physical properties such as adhesive force, the barrier properties, heat stability, flexibility, and the like, may be improved.

In addition, the polyalkylene carbonate resin composition according to the present invention may be eco-friendly and applied for various purposes throughout various industries.

Hereinabove, although the present invention is described by the exemplary embodiments, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A polyalkylene carbonate resin composition comprising:
   (A) a base resin composed of (a) polyalkylene carbonate and (b) at least one resin selected from polyolefin and biodegradable polyester; and
   (B) a first compatibilizer which is a graft-polymerized compatibilizer, wherein the first compatibilizer contains a base resin composed of (a') polyalkylene carbonate and (b') at least one resin selected from polyolefin and biodegradable polyester, (c) a second compatibilizer, and (d) an initiator.

2. The polyalkylene carbonate resin composition of claim 1, wherein the second compatibilizer is at least one selected from (C1-C20)alkyl acrylate based compounds, (C1-C20) alkyl methacrylate based compounds, styrene based compounds, itaconic acid, anhydride of itaconic acid, crotonic acid, anhydride of crotonic acid, fumaric acid, anhydride of fumaric acid, maleic acid, anhydride of maleic acid, silane based compounds, glycidyl acrylate, glycidyl methacrylate and glycidyl ethacrylate.

3. The polyalkylene carbonate resin composition of claim 1, wherein the polyalkylene carbonate has a weight average molecular weight of 30,000 to 300,000 g/mol.

4. The polyalkylene carbonate resin composition of claim 1, containing 0.5 to 10 parts by weight of (B) the first compatibilizer, based on 100 parts by weight of (A) the base resin, wherein (A) the base resin is composed of 5 to 95 wt % of (a) polyalkylene carbonate and 5 to 95 wt % of (b) at least one resin selected from polyolefin and biodegradable polyester.

5. The polyalkylene carbonate resin composition of claim 1, wherein (B) the first compatibilizer contains 0.5 to 10 parts by weight of (c) the second compatibilizer and 0.01 to 1 part by weight of (d) the initiator, based on 100 parts by weight of the base resin contained in the first compatibilizer, and wherein the base resin contained in the first compatibilizer is composed of 20 to 80 wt % of (a') polyalkylene carbonate and 20 to 80 wt % of (b') at least one resin selected from polyolefin and biodegradable polyester.

6. A multilayer film comprising the polyalkylene carbonate resin composition of claim 1.

7. A molded product comprising the polyalkylene carbonate resin composition of claim 1.

* * * * *